(12) United States Patent
Yang et al.

(10) Patent No.: US 9,723,549 B2
(45) Date of Patent: Aug. 1, 2017

(54) COMMUNICATION CONTROL APPARATUS, AUTHENTICATION DEVICE, CENTRAL CONTROL APPARATUS AND COMMUNICATION SYSTEM

(71) Applicant: Youyoubao (Tianjin) Network Technology Co., Ltd., Tianjin (CN)

(72) Inventors: Xianguo Yang, Beijing (CN); Weiping Sun, Beijing (CN)

(73) Assignee: Youyoubao (Tianjin) Network Technology Co., Ltd., Tianjin (CN)

( * ) Notice: Subject to any disclaimer, the term of this patent is extended or adjusted under 35 U.S.C. 154(b) by 0 days.

(21) Appl. No.: 14/959,053

(22) Filed: Dec. 4, 2015

(65) Prior Publication Data

US 2016/0192287 A1    Jun. 30, 2016

(30) Foreign Application Priority Data

Dec. 30, 2014    (CN) .......................... 2014 1 0838428

(51) Int. Cl.
*H04W 36/00* (2009.01)
*H04W 48/18* (2009.01)
(Continued)

(52) U.S. Cl.
CPC ......... *H04W 48/18* (2013.01); *H04L 63/0853* (2013.01); *H04W 12/04* (2013.01);
(Continued)

(58) Field of Classification Search
CPC ..... H04W 48/18; H04W 12/04; H04W 12/06; H04W 36/0072; H04W 8/183;
(Continued)

(56) References Cited

U.S. PATENT DOCUMENTS

2013/0012168 A1    1/2013    Rajadurai et al.
2014/0053241 A1*   2/2014    Norrman ................. H04L 63/08
                                                                       726/3
(Continued)

FOREIGN PATENT DOCUMENTS

CN    101120604 A    2/2008
CN    101222712 A    7/2008
(Continued)

OTHER PUBLICATIONS

Search Report dated Aug. 28, 2015, issued in Chinese Application No. 201410838428.3, entitled "Communication Control Apparatus, Authentication Device, Central Control Apparatus and Communication System," 4 pages, including English translation.
(Continued)

*Primary Examiner* — Huy C Ho
(74) *Attorney, Agent, or Firm* — Hamilton, Brook, Smith & Reynolds, P.C.

(57) ABSTRACT

The present application provides a communication control apparatus, an authentication device, a central control apparatus and a communication system. The communication control apparatus controls the authentication device provided at a mobile terminal and used for authenticating identity of a mobile user, so that the mobile terminal selects different operator networks for communications, and the communication control apparatus includes: a first acquiring unit configured to acquire identification information of the authentication device; a first authenticating unit configured to transmit the identification information to a server, so that the server authenticates identity of the authentication device; a second acquiring unit configured to acquire a session key and attribute setting information encrypted by the session key from the server; and a first transmitting unit configured to transmit to the authentication device the session key and the attribute setting information encrypted by the session
(Continued)

key, so that the authentication device obtains the attribute setting information by decrypting, and sets operator attributes of the authentication device according to the attribute setting information. The present application may help a user overwrite the authentication device on its own, so as to select and use network services of the operator.

5 Claims, 3 Drawing Sheets

(51) Int. Cl.
*H04L 29/06* (2006.01)
*H04W 12/04* (2009.01)
*H04W 12/06* (2009.01)
*H04M 1/66* (2006.01)
*H04W 8/18* (2009.01)
*H04W 36/14* (2009.01)

(52) U.S. Cl.
CPC ....... *H04W 12/06* (2013.01); *H04W 36/0072* (2013.01); *H04W 8/183* (2013.01); *H04W 36/14* (2013.01)

(58) Field of Classification Search
CPC .... H04W 36/14; H04L 63/0853; H04L 63/08; H04L 63/04; H04L 63/0407; H04L 63/0414; H04L 63/0421; H04L 63/0428; H04L 63/0435; H04L 63/0442; H04L 63/0445; H04L 63/0457
USPC ......................................................... 455/411
See application file for complete search history.

(56) References Cited

U.S. PATENT DOCUMENTS

2015/0067328 A1* 3/2015 Yin .................... H04L 63/0807 713/168

| 2015/0072650 A1 | 3/2015 | Xia et al. |
| 2016/0127132 A1 | 5/2016 | Lee et al. |
| 2016/0192287 A1 | 6/2016 | Yang et al. |

FOREIGN PATENT DOCUMENTS

| CN | 101222713 A | 7/2008 |
| CN | 102523578 A | 6/2012 |
| CN | 102769850 A | 11/2012 |
| EP | 2 747 466 A1 | 6/2014 |
| EP | 2747466 A1 | 6/2014 |
| EP | 2747466 A1 | 6/2014 |
| EP | 3041189 A1 | 7/2016 |
| JP | 2012-95306 | 5/2012 |
| JP | 2012095306 A | 5/2012 |
| KR | 20100068692 A | 6/2010 |
| KR | 20130000352 A | 1/2013 |
| KR | 2014 0140820 | 12/2014 |
| TW | 201014331 A1 | 4/2010 |
| TW | 201242409 A1 | 10/2012 |
| WO | WO 2011/115407 A2 | 9/2011 |
| WO | WO 2014/193181 A1 | 4/2014 |
| WO | WO2014193181 A1 | 4/2014 |
| WO | WO 2016/107410 A1 | 7/2016 |

OTHER PUBLICATIONS

European Search Report from Application No. 15196361.8; Dated: May 13, 2016; entitled: "Communication Control Apparatus, Authentication Device, Central Control Apparatus and Communication System".
Australian Patent Examination Report for Patent Application No. 2015261578 issued on Aug. 15, 2016.
Canadian Office Action and Search Report for Patent Application No. 2,913,456 issued Jul. 21, 2016.
Taiwan Office Action and Search Report for Patent Application 104126955 issued Jul. 1, 2016.

* cited by examiner

COMMUNICATION CONTROL APPARATUS, AUTHENTICATION DEVICE, CENTRAL CONTROL APPARATUS AND COMMUNICATION SYSTEM

RELATED APPLICATION

This application claims priority under 35 U.S.C. §119 or 365 to Chinese Application No. 201410838428.3, filed Dec. 30, 2014. The entire teachings of the above application are incorporated herein by reference.

TECHNICAL FIELD

The present disclosure relates to the field of communication technologies, and in particular to a communication control apparatus, an authentication device and a central control apparatus.

BACKGROUND

A subscriber identity module (SIM) card is a device for realizing authentication of identity of a mobile user. The SIM card of each subscriber is written with different number data (i.e. phone number data) by the operator (i.e. the telecom operator), so that it is uniquely identified by the network and accesses the network after it logs in the mobile network.

A common method for writing number data into the SIM card is remote-card-writing, which is an operation that in an operational process, when a subscriber opens an account, the operator sends data to a point of sales (POS) via a remote server, and then uses a card writer to instantaneously write the number data into the SIM card.

In the relevant art, there also exists a SIM sticker card technology, in which there is a bridging film card capable of dual input output between a SIM card of a mobile phone and a SIM card slot of the mobile phone, so as to realize self-defined expansion functions by the programmable film card while ensuring normal interaction of commands between the mobile phone and the SIM card. A common expansion function includes SIM card subscriber identification application development tool (SIM TOOL KIT, STK) expansion, and over-the-air (OTA) update application, etc.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

It was found by the inventors of this application that in the relevant art, for remote-card-writing, an extra card writing hardware device is needed for support, and a user needs to go to a business hall to handle by a staff member. Hence, following problems exist in the existing method of writing number data:

1) according to relevant policies and provisions, a foreign operator cannot simply write and issue a card for a domestic subscriber directly;

2) as being limited by hardware, and customized SIM cards, a card can only be issued to a subscriber indirectly, and the subscriber cannot actively and quickly fulfill SIM card writing and clearance, etc., and hence cannot actively customize and change operators and services; and 3) as the design of the above technologies and corresponding systems from viewpoints of one-way operations of the operators, but not from a third-party common platform, sharing of services of multiple operators cannot be quickly provided for subscribers by way of multi-number writing, and number switch of different operators, etc., or exit of previous operators and join of new operator cannot be realized by rewriting information, in the same SIM card.

Thus, the above three problems make cost and inconvenience of network operators and mobile network subscribers increased.

Furthermore, for the SIM sticker card technology, the SIM sticker card is attached to the surface of the SIM card in a form of a film in the relevant art, so that STK expansion of a common SIM card is realized by using them jointly. Therefore, the SIM sticker card mainly functions to assist the SIM card, and the SIM sticker card is less used to realize subscriber identity identification and network access equivalent to those of the SIM card, and application expansion is also carried out.

Embodiments of the present application provide a communication control apparatus, an authentication device, a central control apparatus and a communication system; wherein the central control apparatus authenticate the authentication device and sends attribute setting information, and the communication control apparatus controls the authentication device, so that the authentication device sets attributes of its own according to the attribute setting information, thereby achieving that the mobile terminal selects different operator networks for communications.

According to an aspect of the embodiments of the present disclosure, there is provided a communication control apparatus, which controls an authentication device provided at a mobile terminal and used for authenticating identity of a mobile user, so that the mobile terminal selects different operator networks for communications, the communication control apparatus is provided at the mobile terminal, and the communication control apparatus including:

a first acquiring unit configured to acquire identification information of the authentication device;

a first authenticating unit configured to transmit the identification information to a server, so that the server authenticates identity of the authentication device;

a second acquiring unit configured to acquire a session key and attribute setting information encrypted by the session key from the server when an identity authentication performed by the server is successful; and a first transmitting unit configured to transmit to the authentication device the session key and the attribute setting information encrypted by the session key, so that the authentication device obtains the attribute setting information by decrypting, and sets operator attributes of the authentication device according to the attribute setting information;

wherein, the attribute setting information has at least an international mobile subscriber identification number (IMSI) and a key identifier (Ki); wherein, the communication control apparatus interacts data with the server by connecting to the Internet.

According to another aspect of the embodiments of the present disclosure, wherein the communication control apparatus is provided at the mobile terminal.

According to a further aspect of the embodiments of the present disclosure, wherein the communication control apparatus further includes a handover controlling unit, the handover controlling unit being configured to receive a notification that the authentication device successfully sets the operator attributes, and selects an operator attribute according to a received handover instruction when the number of the operator attributes is more than two, so that the mobile terminal is handed over to a network corresponding to the selected operator attribute for communications.

According to still another aspect of the embodiments of the present disclosure, wherein the communication control apparatus further includes:

a deletion controlling unit configured to control the authentication device according to a received deletion instruction to delete the operator attributes.

According to still another aspect of the embodiments of the present disclosure, there is provided an authentication device, which is provided at a mobile terminal and used for authenticating identity of a mobile user, so that the mobile terminal performs communications in a network, the authentication device including:

a third acquiring unit configured to communicate with a communication control apparatus provided at the mobile terminal, and acquire, via the communication control apparatus, a session key issued by a server and attribute setting information encrypted by the session key;

a decrypting unit configured to decrypt the attribute setting information encrypted by the session key according to a decryption algorithm and the session key, so as to obtain the attribute setting information; and a setting unit configured to set operator attributes of the authentication device according to the attribute setting information; wherein, the communication control apparatus interacts data with the server by connecting to the Internet.

According to still another aspect of the embodiments of the present disclosure, wherein the authentication device further includes a storing unit configured to store the attribute setting information, an encryption algorithm and the decryption algorithm.

According to still another aspect of the embodiments of the present disclosure, wherein the authentication device further includes a notifying unit configured to transmit notification information after the setting unit successfully sets the operator attributes.

According to still another aspect of the embodiments of the present disclosure, wherein the authentication device is a subscriber identity module (SIM) card, a chip jointed with the subscriber identity module card, or a device built in the mobile terminal and having the same function as the subscriber identity module card.

According to still another aspect of the embodiments of the present disclosure, there is provided a central control apparatus, provided in a server, the central control apparatus including:

a first receiving unit configured to communicate with a communication control apparatus provided at a mobile terminal, so as to receive identification information of an authentication device provided at the mobile terminal and used for authenticating identity of a mobile user a second authenticating unit configured to authenticate identity of the authentication device according to the identification information and encryption information, and set up a session key when the authentication is successful; and a second transmitting unit configured to transmit to the communication control apparatus of the mobile terminal the session key and attribute setting information encrypted by the session key, so that the communication control apparatus transmits to the authentication device the session key and attribute setting information encrypted by the session key, and the authentication device obtains the attribute setting information by decrypting and set operator attributes of the authentication device according to the attribute setting information; wherein, the attribute setting information is stored in the server; wherein, the communication control apparatus interacts data with the server by connecting to the Internet.

According to still another aspect of the embodiments of the present disclosure, wherein the central control apparatus further includes a managing unit configured to manage the attribute setting information.

An advantage of the embodiments of the present disclosure exists in that the communication control apparatus may transmit to the authentication device, the encrypted attribute setting information and the session key obtained from the server and the authentication device may set or update the operator attributes of its own according to the attribute setting information sent by the server, so that the user may conveniently perform card writing on the authentication device via the communication control apparatus, thereby improving flexibility of the card writing of the user, making the authentication device possess number resources of multiple operators, and achieving that the user is capable of performing selection on its own to use network services of multiple operators.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of the present disclosure only, and a person of ordinary skill in the art may obtain other accompanying drawings according to these accompanying drawings without making an inventive effort. In the drawings.

DETAILED DESCRIPTION

The foregoing and other features of the present disclosure shall become apparent from the following description with reference to the accompanying drawings. Particular embodiments of the present disclosure are disclosed in the description and drawings, which indicate part of the embodiments that may employ the principle of the present disclosure. It should be understood that the present disclosure is not limited to the described embodiments, on the contrary, the present disclosure includes all the modifications, variations and equivalents falling within the scope of the appended claims.

In this application, the communication control apparatus and the central control apparatus may be carried out by software. For example, the communication control apparatus may be an application (APP) used by the mobile terminal, and the central control apparatus may be an application used by a server; however, the embodiments are not limited thereto, and the communication control apparatus and the central control apparatus may be carried out by hardware, and may also be carried out by hardware in combination with software, and the relevant art may be referred to particular implementation.

In this application, the authentication device may be a subscriber identity module (SIM) card, a chip jointed with the subscriber identity module card, such as a SIM sticker card, or a device integrated in the mobile terminal and having the same function as the subscriber identity module card, such as an eSIM card, etc.; and functions of the parts of the authentication device may be carried out by a chip operation system (COS). However, the embodiments are not limited thereto, and the functions of the parts of the authentication device may also be carried out by hardware, or hardware in combination with software, and the relevant art may be referred to particular implementation.

In this application, the mobile terminal may be such portable electronic equipment as a functional mobile phone, a smart mobile phone, or a tablet computer.

Embodiment 1

An embodiment of this application provides a communication control apparatus, which controls an authentication device provided at a mobile terminal and used for authenticating identity of a mobile user, so that the mobile terminal selects different operator networks for communications.

Figure 1:
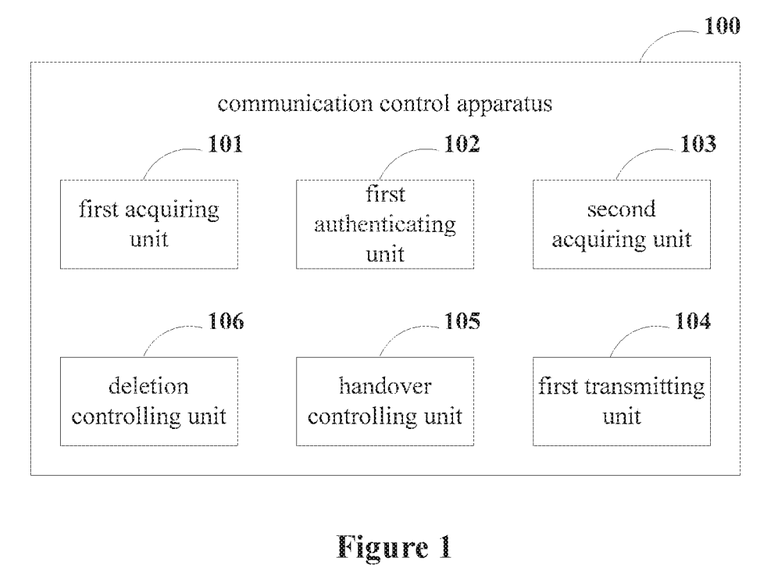
FIG. 1 is a schematic diagram of a structure of a communication control apparatus of an embodiment of this application.

FIG. 1 is a schematic diagram of a structure of the communication control apparatus of the embodiment of this application. As shown in FIG. 1, the communication control apparatus 100 may include a first acquiring unit 101, a first authenticating unit 102, a second acquiring unit 103 and a first transmitting unit 104.

The first acquiring unit 101 is configured to acquire identification information of the authentication device; for example, the identification information may be an integrated circuit card identity (ICCID); of course, the identification information may also be other information; the first authenticating unit 102 is configured to transmit the identification information to a server, so that the server authenticates identity of the authentication device; the second acquiring unit 103 is configured to acquire a session key and attribute setting information encrypted by the session key from the server; and the first transmitting unit 104 is configured to transmit to the authentication device the session key and the attribute setting information encrypted by the session key, so that the authentication device obtains the attribute setting information by decrypting, and sets operator attributes of the authentication device according to the attribute setting information.

In this embodiment, the attribute setting information may be for example an international mobile subscriber identification number (IMSI) and a key identifier (Ki); however, this embodiment is not limited thereto, and the attribute setting information may also be other information, only if the authentication device can be controlled to set its operator attributes so that the mobile terminal is capable of communicating in networks to which the operator attributes correspond.

With this embodiment, the communication control apparatus may transmit to the authentication device the encrypted attribute setting information and the session key obtained from the server. Hence, under the control of the communication control apparatus, the authentication device may set or update the operator attributes of its own according the attribute setting information sent by the server, such as IMSI, and Ki, etc. The operator attributes may be the IMSI, and Ki, etc., hence, the subscriber may be able to perform card writing on the authentication device in a convenient manner. Therefore, in a case where the operator attributes are selected, a corresponding phone number is used to communicate in a network to which the operator attributes correspond.

In this embodiment, the first acquiring unit 101 may acquire the ICCID of the authentication device via an ICCID inquiry interface of the authentication device; furthermore, the first acquiring unit 101 may acquire information on whether the operator attributes of the authentication device have been set; for example, the first acquiring unit 101 may acquire information on whether the IMSI of the authentication device has been configured via an IMSI configuration information inquiry interface of the authentication device.

In this embodiment, if the communication control apparatus acquires that the operator attributes of the authentication device have not been set, it may request the server to send the attribute setting information; and if the communication control apparatus acquires that the operator attributes of the authentication device have been set, it may make the mobile terminal use the network corresponding to the operator attributes for communications.

In this embodiment, the first authenticating unit 102 may, for example, schedule a server interaction interface of the communication control apparatus to transmit the ICCID of the authentication device to the server, so the server authenticates the identity of the authentication device according to the ICCID. If the identity authentication is successful, the server may provide services to the authentication device; and if the identity authentication is unsuccessful, it shows that the authentication device is not registered in the server in advance, and is not an object to which the server provides services. Furthermore, the first authenticating unit 102 may authenticate the identity of the server, so as to confirm whether the server is a valid server, and prevent the mobile terminal from being connected to a pseudo server. In this embodiment, particular manners of authenticating the identity of the authentication device by the server and authenticating the identity of the server by the communication control apparatus may be manners in the relevant art, and are not particularly limited in this embodiment.

In this embodiment, the second acquiring unit 103 may schedule the server interaction interface of the communication control apparatus to receive the session key and the encrypted attribute setting information from the server. And, in this embodiment, the number of pieces of the encrypted attribute setting information from the server may be more than two, hence, more than two operator attributes may be set in the authentication device, the more than two operator attributes corresponding respectively to different network operators, thereby enabling the mobile terminal to be handed over between multiple different network operators.

In this embodiment, the first transmitting unit 104 may, for example, transmit to the authentication device the session key and the encrypted attribute setting information via an interface for interacting data with the authentication device, so that the authentication device obtains the attribute setting information by decrypting, and sets the operator attributes of the authentication device according to the attribute setting information.

In this embodiment, as shown in FIG. 1, the communication control apparatus 100 may further include a handover controlling unit 105 configured to receive a notification that the authentication device successfully sets the operator attributes, and selects an operator attribute according to a received handover instruction when the number of the operator attributes is more than two, so that the mobile terminal is handed over to a network corresponding to the selected operator attribute for communications. For example, in a case where the authentication device of the mobile terminal is provided with more than two operator attributes, or the mobile terminal is provided with more than two authentication devices, and each of the authentication devices is provided with at least one operator attribute, operators to which the more than two operator attributes correspond may be displayed on a user interface (UI) of the mobile terminal, and a selecting operation of an operator on the user interface may be transferred into a handover instruction and transmitted to the handover controlling unit. Hence, the handover controlling unit transmits a control signal to the authentication device, so that the authentication device selects the IMSI and Ki corresponding to the operator selected by the user, and the mobile terminal is handed over to the network corresponding to the selected IMSI and Ki for communications. In this embodiment, the relevant art may be referred to for a particular method for selecting the corresponding IMSI and Ki by the authentication device so that the mobile terminal communicates in the corresponding network, which shall not be described herein any further.

The handover controlling unit 105 may select one of the operator attributes, so that the mobile terminal is handed over to the network corresponding to the selected operator attribute for communications.

In this embodiment, as shown in FIG. 1, the communication control apparatus 100 may further include a deletion controlling unit 106 configured to control the authentication device to delete the operator attributes. For example, the deletion controlling unit 106 may transmit to the authentication device a control instruction for deleting the operator attributes via an interface for interacting data with the authentication device, so that the authentication device deletes corresponding operator attributes according to the control instruction.

In the present application, the communication control apparatus may be connected to the Internet by using a network connection module of the mobile terminal via a wireless local network, etc., so as to interact data with the server. Hence, in a case where a mobile network of an operator cannot cover, the operator attributes may be set for the authentication device.

Furthermore, in this embodiment, the communication control apparatus 100 may include a network bank payment unit (not shown) configured to provide a network bank payment function. The relevant art may be referred to for an implementation of the network bank payment unit, which shall not be described in this embodiment any further.

In this embodiment, the communication control apparatus 100 may be provided at the mobile terminal, so as to control the authentication device of the mobile terminal. However, this embodiment is not limited thereto, and the communication control apparatus 100 may also be provided at other mobile terminals or electronic equipment, and control an authentication device of a local mobile terminal in a remote control manner.

With this embodiment of the present application, the encrypted attribute setting information and the session key obtained from the server may be transmitted to the authentication device by the communication control apparatus. Hence, under the control of the communication control apparatus, the authentication device may set or update the operator attributes of the authentication device own, such as IMSI, and Ki, etc., according to the attribute setting information sent by the server, such as IMSI, and Ki, etc.; and the mobile terminal may be handed over between different networks by providing the handover controlling unit, without needing to change the authentication device. In this way, the subscriber may conveniently hand over the operator network used by the mobile terminal; and the communication control apparatus may be connected to the Internet via a wireless local network, etc., and interact data with the server, so as to set the operator attributes for the authentication device, thereby performing card writing independent of coverage of a mobile network.

Embodiment 2

An embodiment of the present application provides an authentication device, which is provided at a mobile terminal and used for authenticating identity of a mobile user, so that the mobile terminal performs communications in a network, and which is controlled by the communication control apparatus described in Embodiment 1.

Figure 2:
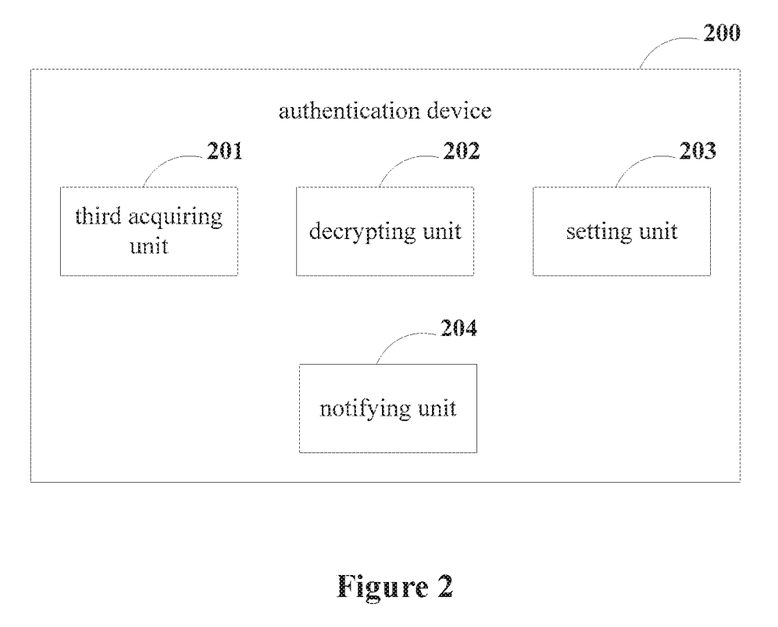
FIG. 2 is a schematic diagram of a structure of an authentication device of an embodiment of this application.

FIG. 2 is a schematic diagram of a structure of the authentication device of this embodiment. As shown in FIG. 2, the authentication device may include: a third acquiring unit 201, a decrypting unit 202 and a setting unit 203.

The third acquiring unit 201 is configured to acquire, via a communication control apparatus of the mobile terminal, a session key issued by a server and attribute setting information encrypted by the session key, the decrypting unit 202 is configured to decrypt the attribute setting information encrypted by the session key according to a decryption algorithm and the session key, so as to obtain the attribute setting information, and the setting unit 203 is configured to set operator attributes of the authentication device according to the attribute setting information.

In this embodiment, the third acquiring unit 201 may acquire, via an interface interacting data with the communication control apparatus 100 of Embodiment 1, the session key issued by the server and the attribute setting information encrypted by the session key, from the communication control apparatus 100.

In this embodiment, the decrypting unit 202 may decrypt the attribute setting information encrypted by the session key according to the decryption algorithm and the session key, so as to obtain the attribute setting information. In this embodiment, the decryption algorithm may be, for example, an SM4 data decryption algorithm and/or an SM3-HMAC (hash-based message authentication code) algorithm, and the decrypting unit 202 may perform the decryption operation by scheduling SM4 data plus a decryption interface and/or an SM3-HMAC algorithm interface, so as to obtain the attribute setting information, such as IMSI, and Ki, etc. However, this embodiment is not limited thereto, and other decryption algorithms may also be used for decryption.

In this embodiment, the setting unit 203 may set the operator attributes of the authentication device own according to the attribute setting information. For example, the setting unit 203 may schedule an IMSI configuration interface and a Ki configuration interface to set IMSI and Ki of the authentication device own according to the IMSI and Ki sent by the server obtained by decrypting; and, the IMSI may differentiate and identify subscribers of a mobile network, and the Ki is a key for transfer of encrypted data between f the authentication device and an operator; and according to the IMSI and Ki, the mobile terminal may perform communication in a network provided by a network operator to which the IMSI and Ki correspond.

In this embodiment, as shown in FIG. 1, the authentication device may further includes a notifying unit 204 configured to transmit notification information to the communication control apparatus of Embodiment 1 after the setting unit 203 successfully sets the operator attributes. Thus, the communication control apparatus is able to confirm according to the notification information that the operator attributes are successfully set.

In this embodiment, as shown in FIG. 1, the authentication device may further includes a storing unit 205 configured to store the attribute setting information, an encryption algorithm and the decryption algorithm, such as the SM4 data encryption and decryption algorithms, and the SM3-HMAC algorithm, etc.

Furthermore, in this embodiment, the authentication device may provide a data path in conformity with a transport protocol data unit (TPDU) protocol, so that the authentication device performs data transmission with the outside; and the authentication device may further include a noise source reading interface, and the relevant art may be referred to for explanation of the noise source reading interface.

Furthermore, in this embodiment, the authentication device may include an ICCID inquiry interface, and an IMSI configuration information inquiry interface, etc., configured to provide inquiry results of the ICCID and IMSI configuration information of the authentication device to the communication control apparatus of Embodiment 1.

According to this embodiment, the authentication device may decrypt the encrypted attribute setting information sent by the server and received by the communication control apparatus of the mobile terminal, and set the operator attributes of the authentication device own according to the attribute setting information, thereby making the mobile terminal perform communication in the network provided by the network operator to which the operator attributes correspond.

Embodiment 3

An embodiment of the present disclosure provides a central control apparatus, which is provided in a server.

Figure 3:
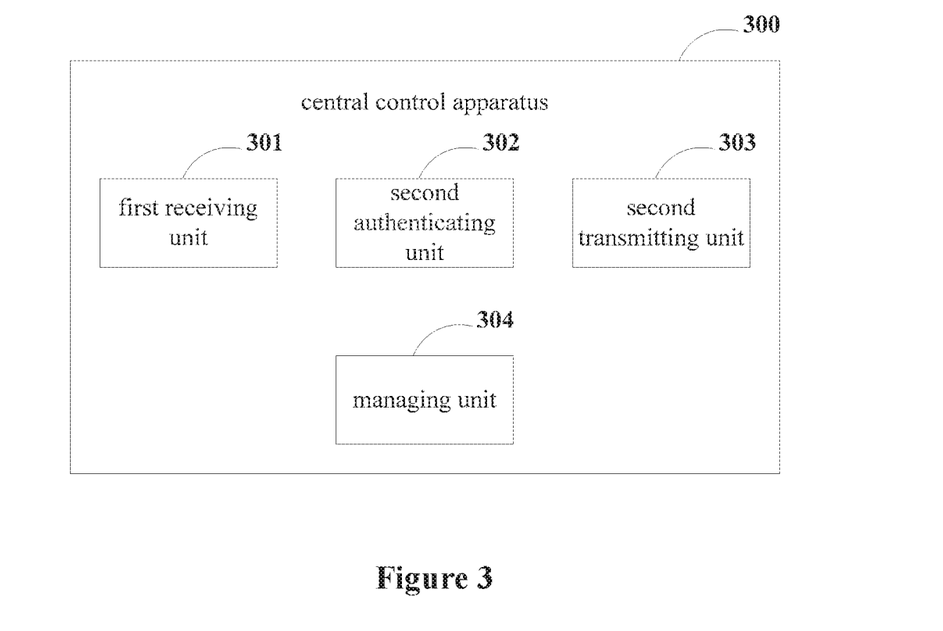
FIG. 3 is a schematic diagram of a structure of a central control apparatus of an embodiment of this application.

FIG. 3 is a schematic diagram of a structure of the central control apparatus of the embodiment of this application. As shown in FIG. 3, the central control apparatus includes a first receiving unit 301, a second authenticating unit 302 and a second transmitting unit 303.

The first receiving unit 301 is configured to receive identification information of an authentication device provided at a mobile terminal and used for authenticating identity of a mobile user; for example, the identification information may be an integrated circuit card identifier; and, the identification information may also be other information; the second authenticating unit 302 is configured to authenticate identity of the authentication device according to the identification information and encryption information, and set up a session key when the authentication is successful; and the second transmitting unit 303 is configured to transmit to the mobile terminal the session key and attribute setting information encrypted by the session key, so that the authentication device obtains the attribute setting information by decrypting and set operator attributes of the authentication device according to the attribute setting information; wherein, the attribute setting information is stored in the server.

In this embodiment, the first receiving unit 301 may receive ICCID of the authentication device from the communication control apparatus 100 of Embodiment 1; for example, the first receiving unit 301 may schedule an interface in the server for communicating with the mobile terminal to receive the ICCID.

In this embodiment, the second authenticating unit 302 may authenticate the identity of the authentication device according to the received ICCID and the encryption information, so as to decide whether to provide services to the authentication device. If the authentication fails, the central control apparatus rejects to provide services to the authentication device; and if the authentication succeeds, the central control apparatus provides services to the authentication device, and sets up the session key.

In this embodiment, the second transmitting unit 303 may schedule the interface in the server for communicating with the mobile terminal to transmit to the mobile terminal the session key and the attribute setting information encrypted by the session key, so that the authentication device obtains the attribute setting information by decrypting and set operator attributes of the authentication device according to the attribute setting information.

In this embodiment, the attribute setting information may be, for example, prestored in a database of the server, and the central control apparatus may obtain the attribute setting information by scheduling an interface accessing the database, and encrypt the attribute setting information by using the session key.

In this embodiment, the central control apparatus 300 may further include a managing unit 304 configured to manage the attribute setting information. In a particular implementation, the managing unit 304 may be configured to update the attribute setting information stored in the server according to data of the network operator. For example, when a subscriber reports the lost of a mobile phone number, information on the mobile phone number in the database of the network operator may be deleted or changed. At this moment, the central control apparatus obtains data update information of the network operator via an interface provided for the network operator, and the managing unit 304 may update the corresponding attribute setting information stored in the server, such as deleting, or changing, etc.

Furthermore, in this embodiment, the central control apparatus 300 may further include a network bank payment interface (not shown) configured to be used as an authentication interface between the server and a network bank when the mobile terminal performs network bank payment.

According to this embodiment, a central server may send the attribute setting information to the authentication device in an encrypted manner. Hence, the authentication device may obtain the attribute setting information in a safe manner, and set the operator attributes of its own, so that the mobile terminal communicates in the network provided by the network operator to which the operator attributes correspond.

Embodiment 4

An embodiment of the present application provides a communication system, including the communication control apparatus 100 in Embodiment 1, the authentication device 200 in Embodiment 2 and the central control apparatus 300 in Embodiment 3. Embodiments 1-3 may be referred to for detailed description of the components of the system, which shall not be described herein any further.

Figure 4:
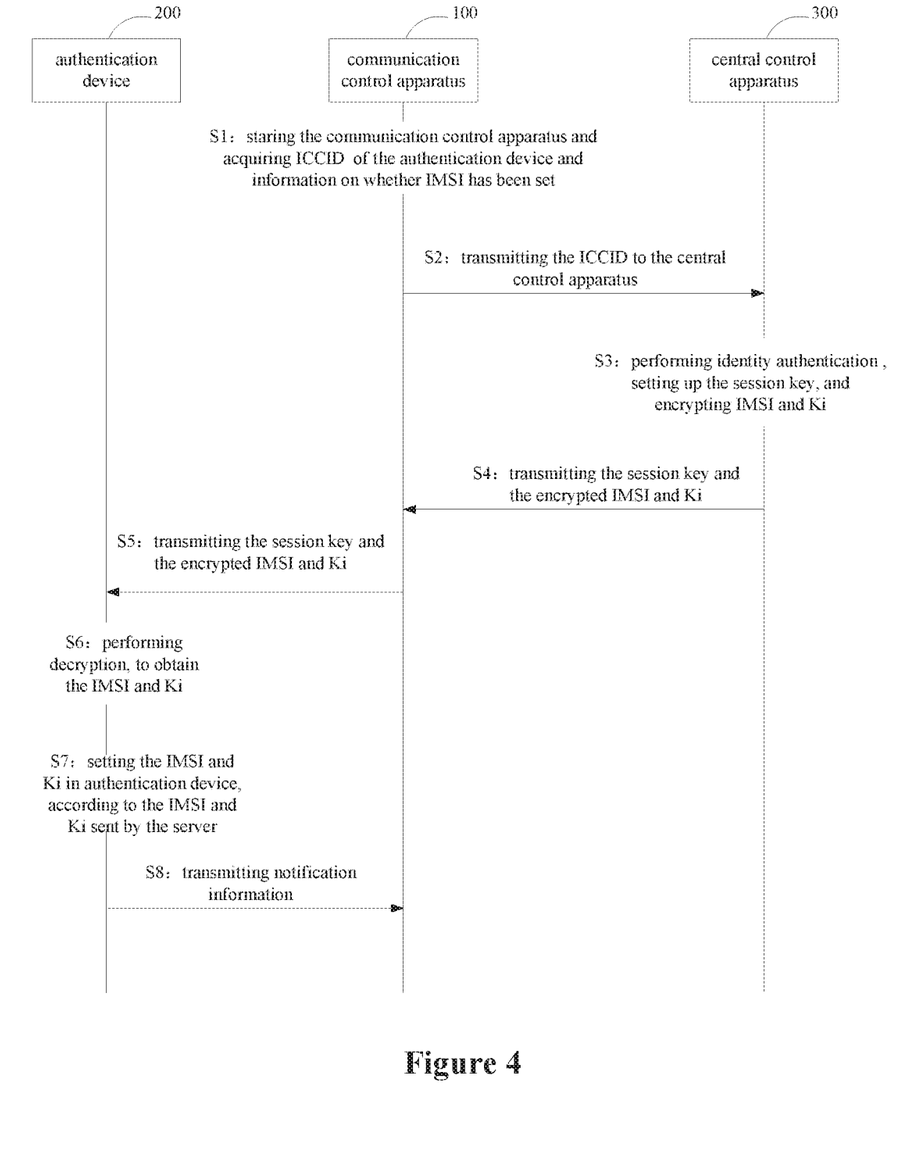
FIG. 4 is a flowchart of setting operator attributes for the authentication device by the communication system of an embodiment of this application.

FIG. 4 is a flowchart of setting operator attributes for the authentication device by the communication system of this embodiment. As shown in FIG. 4, the flow includes:

S1: staring the communication control apparatus 100 and acquiring identification information (such as ICCID, etc.) of the authentication device and information on whether IMSI has been set;

S2: transmitting to the central control apparatus 300 the identification information (such as ICCID, etc.) by the communication control apparatus 100 after an instruction for opening the authentication device transmitted by the subscriber is received, if it is judged that the IMSI has not been set, showing that the authentication device is not opened;

S3: performing identity authentication by the central control apparatus according to the identification information (such as ICCID, etc.) and the encryption information, setting up the session key if the authentication is successful, and encrypting the IMSI and Ki by using the session key;

S4: transmitting the session key and the encrypted IMSI and Ki to the communication control apparatus 100;

S5: transmitting the session key and the encrypted IMSI and Ki to the authentication device 200 by the communication control apparatus 100;

S6: performing decryption by the authentication device 200 according to the session key and a decryption algorithm, so as to obtain the IMSI and Ki sent by the server;

S7: setting the IMSI and Ki in the authentication device 200 by the authentication device 200 according to the IMSI and Ki sent by the server;

S8: transmitting to the communication control apparatus 100 notification information on successful setting of the IMSI and Ki by the authentication device 200.

The operator attributes can be set for the authentication device 200 according to S1-S8 in FIG. 4; that is, performing card writing operation on the authentication device.

Furthermore, in this embodiment, the authentication device may be controlled by the communication control apparatus to delete the operator attributes; that is, performing card clearance operation on the authentication device.

Furthermore, in this embodiment, when it is judged in S2 that the IMSI of the authentication device 200 has been set, the communication control apparatus 100 may control the authentication device to select the IMSI and Ki, so that the mobile device is handed over to the network provided by the operator to which the selected IMSI and Ki correspond for communications.

Furthermore, in this embodiment, the managing unit 304 of the central control apparatus 300 may update the attribute setting information stored in the server according to the data of the network operator, thereby terminating provision of services to the lost authentication device, that is, reporting the lost of card of the authentication device.

Furthermore, in this embodiment, a network bank payment function may be carried by the network bank payment unit of the communication control apparatus 100 and the network bank payment interface of the central control apparatus 300.

According to this embodiment, intermediate and restrictive conditions in conventional card writing may be efficiently reduced, and such functions as card writing, card clearance, and network handover, etc., may be conveniently performed, thereby improving a right of selection of the subscriber on its own.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

What is claimed is:

1. A communication control apparatus, which controls an authentication device provided at a mobile terminal and used for authenticating identity of a mobile user, so that the mobile terminal selects different operator networks for communications, the communication control apparatus is provided at the mobile terminal, and the communication control apparatus is configured to:

acquire identification information of the authentication device;

transmit the identification information to a server, so that the server authenticates identity of the authentication device;

acquire a session key and attribute setting information encrypted by the session key from the server when an identity authentication performed by the server is successful;

transmit to the authentication device the session key and the attribute setting information encrypted by the session key, so that the authentication device obtains the attribute setting information by decrypting, and sets operator attributes of the authentication device according to the attribute setting information;

receive a notification that the authentication device successfully sets the operator attributes, and selects an operator attribute according to a received handover instruction when the number of the operator attributes is more than two, so that the mobile terminal is handed over to a network corresponding to the selected operator attribute for communications; and control the authentication device according to a received deletion instruction to delete the operator attributes, wherein, the authentication device and the communication control apparatus communicate with each other through a data path in conformity with a transport protocol data unit (TPDU) protocol, wherein, the attribute setting information has at least an international mobile subscriber identification number (IMSI) and a key identifier (Ki), wherein, the communication control apparatus interacts data with the server by connecting to the Internet.

2. An authentication device, which is provided at a mobile terminal and used for authenticating identity of a mobile user, so that the mobile terminal performs communications in a network, the authentication device configured to:
communicate with a communication control apparatus provided at the mobile terminal, and acquire, via the communication control apparatus, a session key issued by a server and attribute setting information encrypted by the session key;
decrypt the attribute setting information encrypted by the session key according to a decryption algorithm and the session key, so as to obtain the attribute setting information;
set operator attributes of the authentication device according to the attribute setting information;
transmit notification information after the authentication device successfully sets the operator attributes;
when the authentication device successfully sets more than two operator attributes and the communication control apparatus selects one operator attribute, the authentication device makes the mobile terminal to be handed over to a network corresponding to the selected operator attribute for communications; and
delete the operator attribute according to the control of the communication control apparatus,
wherein, the authentication device and the communication control apparatus communicate with each other through a data path in conformity with a transport protocol data unit (TPDU) protocol,
wherein, the attribute setting information has at least an international mobile subscriber identification number (IMSI) and a key identifier (Ki),
wherein, the communication control apparatus interacts data with the server by connecting to the Internet.

3. The authentication device according to claim 2, wherein the authentication device is further configured to:
store the attribute setting information, an encryption algorithm and the decryption algorithm.

4. The authentication device according to claim 2, wherein,
the authentication device is a subscriber identity module (SIM) card, a chip jointed with the subscriber identity module card, or a device built in the mobile terminal and having the same function as the subscriber identity module card.

5. A central control apparatus, provided in a server, the central control apparatus configured to:
communicate with a communication control apparatus provided at a mobile terminal, so as to receive identification information of an authentication device provided at the mobile terminal and used for authenticating identity of a mobile user;
authenticate identity of the authentication device according to the identification information and encryption information, and set up a session key when the authentication is successful;
transmit to the communication control apparatus of the mobile terminal the session key and attribute setting information encrypted by the session key, so that the communication control apparatus transmits to the authentication device the session key and attribute setting information encrypted by the session key, and the authentication device obtains the attribute setting information by decrypting and sets operator attributes of the authentication device according to the attribute setting information; and
manage the attribute setting information;
when the authentication device successfully sets more than two operator attributes and the communication control apparatus selects one operator attribute, the authentication device makes the mobile terminal to be handed over to a network corresponding to the selected operator attribute for communications;
the authentication device deletes the operator attribute according to the control of the communication control apparatus,
wherein, the authentication device and the communication control apparatus communicate with each other through a data path in conformity with a transport protocol data unit (TPDU) protocol,
wherein, the attribute setting information has at least an international mobile subscriber identification number (IMSI) and a key identifier (Ki),
wherein, the communication control apparatus interacts data with the server by connecting to the Internet.

* * * * *